United States Patent [19]
Kao et al.

[11] Patent Number: 6,116,387
[45] Date of Patent: Sep. 12, 2000

[54] DISC BRAKE ROTOR

[75] Inventors: Tseng Kuan Kao, Rugby; William Anthony Thorpe, Burbage, both of United Kingdom

[73] Assignee: T&N Technology Limited, Rugby, United Kingdom

[21] Appl. No.: 09/194,235

[22] PCT Filed: May 22, 1997

[86] PCT No.: PCT/GB97/01401

§ 371 Date: Nov. 23, 1998

§ 102(e) Date: Nov. 23, 1998

[87] PCT Pub. No.: WO97/48918

PCT Pub. Date: Dec. 24, 1997

[30] Foreign Application Priority Data

Jun. 19, 1996 [GB] United Kingdom .................. 9612788

[51] Int. Cl.⁷ .................................................. F16D 65/10
[52] U.S. Cl. ............................ 188/264 A; 188/218 XL; 192/113.23
[58] Field of Search .................................. 188/17, 18 A, 188/18 R, 58, 218 XL, 264 A, 264 AA; 192/113.26, 113.23, 113.2

[56] References Cited

U.S. PATENT DOCUMENTS

| | | | |
|---|---|---|---|
| 2,464,754 | 3/1949 | Tack | 188/218 XL |
| 2,621,762 | 12/1952 | Backman | 188/218 XL |
| 3,465,853 | 9/1969 | Zabalbeitia | 188/163 |
| 4,488,074 | 12/1984 | Marandet | 310/93 |
| 4,509,933 | 4/1985 | Miranti, Jr. et al. | 474/93 |
| 4,651,851 | 3/1987 | Latvala et al. | 188/218 XL |
| 4,928,798 | 5/1990 | Watson et al. | 188/218 XL |
| 5,427,212 | 6/1995 | Shimazu et al. | 188/218 XL |
| 5,706,915 | 1/1998 | Shimazu et al. | 188/71.6 |

FOREIGN PATENT DOCUMENTS

| | | | |
|---|---|---|---|
| 508865 | 10/1992 | European Pat. Off. | F16D 65/12 |
| 521754 | 1/1993 | European Pat. Off. | F16D 65/847 |
| 846042 | 8/1952 | Germany | 188/264 |
| 3800502 | 1/1989 | Germany | F16D 65/12 |
| 19533136 | 3/1996 | Germany | F16D 65/12 |
| 2057609 | 4/1991 | United Kingdom | F16D 65/84 |

OTHER PUBLICATIONS

Patent Abstracts of Japan, vol. 008, No. 083 (M–290), Apr. 17, 1984 & JP 59 001825 A (Akebono Brake), Jan. 7, 1984 (see abstract; Figure 1).

Primary Examiner—Robert J. Oberleitner
Assistant Examiner—Lan Nguyen
Attorney, Agent, or Firm—Synnestvedt & Lechner LLP

[57] ABSTRACT

A disc brake rotor comprises mounting portion, a first friction portion which provides an annular friction surface, a second friction portion which provides the other of annular friction surface, a connecting portion which joins the mounting portion to the first friction portion, and vanes which extend between the friction portions and support the second friction portion. The vanes define cooling ducts extending radially outwardly of the rotor. The first and the second friction portions vary in thickness in radial directions, the first friction portion having its greatest thickness at a radius which is greater than the radius at which the second friction portion has its greatest thickness.

9 Claims, 3 Drawing Sheets

DISC BRAKE ROTOR

This invention is concerned with disc brake rotors.

A disc brake rotor is arranged to rotate with a member, such as a wheel hub of a vehicle or a rotating part of a machine. Such a rotor provides two oppositely-facing annular friction surfaces which, in the operation of the brake, are engaged by two blocks of friction material which are moved (usually by hydraulic or pneumatic means) towards one another into contact with the two friction surfaces so that frictional forces occur slowing the rotation of said rotor, and hence of said member.

In order to reduce temperature rises in disc brake rotors caused by the frictional forces, it is conventional to form the rotor so that it comprises a first generally annular friction portion which provides one of said annular friction surfaces, and a second generally annular friction portion which provides the other of said annular friction surfaces. Said first and second friction portions are conventionally of constant thickness so that they have substantially equal thermal capacity at all points thereof. Said friction portions are arranged in spaced parallel relationship. These friction portions are joined by vanes between which are cooling ducts extending radially outwardly of the rotor. The cooling ducts are arranged so that, as the rotor is rotated, air passes through the ducts and acts to cool said friction portions. Air inlets to said ducts are provided at an inner edge of said first and second friction portions and the rotor functions as a centrifugal fan driving air outwardly to outlets at the outer edges of said friction portions.

The most common type of disc brake rotor used on vehicles is the so-called "top hat" type. In addition to first and second friction portions, as mentioned above, this type of rotor comprises an annular mounting portion arranged to engage the member with which the rotor rotates and be secured thereto. The rotor also comprises a generally cylindrical connecting portion which extends axially and joins said mounting portion to said first friction portion. The first friction portion is, thus, displaced axially relative to the mounting portion and is supported by the connecting portion. The second friction portion is supported by said vanes.

Most rotors of the "top hat" type have their first friction portion nearer to the mounting portion than their second friction portion. This means that there is free access for the cooling air between the inner edges of the first and second friction portions. However, this design is subject to the problem known as "coning". Coning occurs when the friction portions become hot and expand while the connecting portion, which is not so hot, expands less. The connecting portion, thus, is pulled into a slightly conical form by the first friction portion, expansion of the second friction portion enhancing this effect. This results in the friction portions bending out of their initial planes. This bending causes greater pressures to occur during braking at some parts of the friction portions so that more heat is generated. These portions of the friction portions, thus, have to absorb greater amounts of heat than other portions thereof. This causes temperature differentials which affect the performance of the brake and also affect the wear of the rotor and the brake pads. Such differentials can also result in cracking of the rotor.

The problem of coning is discussed in U.S. Pat. Nos. 3,378,114 and 4,651,851. The latter of these proposes the solution of attaching the first friction portion to the connecting portion further from the mounting portion than the distance between the mounting portion and the second friction portion. This design partially counteracts the problem of coning as expansion of the second friction portion opposes rather than enhances the inclination caused by expansion of the first friction portion. Furthermore, the connecting portion is longer so that a given expansion causes less inclination. This design is partially successful in evening out the pressure across the friction surfaces and thereby reduces temperature differentials. However, these differentials still exist and, additionally, this design has the disadvantage that the connecting portion obstructs the air entry between the friction portions.

It is an object of the present invention to provide a disc brake rotor in which temperature differentials are reduced.

The invention provides a disc brake rotor arranged to rotate with a member about an axis and providing two oppositely-facing annular friction surfaces, the rotor comprising a mounting portion arranged to engage said member and be secured thereto, a first friction portion which provides one of said annular surfaces, and a second friction portion which provides the other of said annular surfaces, said first and second friction portions being displaced axially relative to said mounting portion and being arranged in spaced parallel relationship, the first friction portion being supported by a connecting portion of the rotor which extends axially and joins said mounting portion to said first friction portion, the second friction portion being supported by vanes which extend between said friction portions and define cooling ducts extending radially outwardly of the rotor, the ducts being arranged so that, as the rotor is rotated, air passes through the ducts and acts to cool the rotor, characterised in that the first and the second friction portions vary in thickness in radial directions, the first friction portion having its greatest thickness at a greater radius than the radius at which the second friction portion has its greatest thickness.

In a rotor according to the invention, the friction portions have varying thermal capacity with the thermal capacity being greater where the greater pressures are to be expected. It is possible to calculate where the greatest thermal capacity is required and arrange that the friction portion has its greatest thickness there. The invention is applicable to rotors in which the first friction portion is nearer to the mounting portion than the second friction portion and also to rotors in which the second friction portion is nearer to the mounting portion. The invention is also applicable to rotors in which the cooling ducts are curved rather than straight. WO 95/08727 describes a rotor in which the friction portions increase progressively in thickness and reach their greatest thickness at their outer edges. This arrangement is intended to provide cooling ducts of constant cross-section and does not match the thickness to the required thermal capacity. The invention is applicable to rotors with radially extending vanes and to rotors with forwardly or backwardly curved vanes.

Preferably, in a rotor according to the invention, the first friction portion has its greatest thickness at a radius which is greater than a medial radius which is the radius of the mid-points of the ducts, and the second friction portion has its greatest thickness at a radius which is less than said medial radius.

In a rotor according to the invention, the first friction portion may be thickest adjacent to its radially outer edge and the second friction portion may be thickest adjacent to its radially inner edge. The first friction portion may be thinnest adjacent to its radially inner edge, and the second friction portion may be thinnest adjacent to its radially outer edge. The thicknesses of said first and second friction portions may vary uniformly between their thickest and thinnest parts. For example, the combined thickness of the first and the second friction portions may be substantially equal along the length of the cooling ducts.

In order to enhance the cooling effect, in a rotor according to the invention, the thickness of the first and the second friction portions varies so that the transverse cross-sectional area of each duct decreases progressively between an inlet to the duct and an intermediate region thereof and increases between said intermediate region and an outlet of the duct. Thus, in this design, air flowing in each duct is accelerated to its maximum velocity which it reaches at said intermediate region and thereafter is decelerated. Thus, the maximum cooling effect occurs in the region of the thickest section of the second friction portion, which is where the highest rotor temperature occurs. The duct can be considered to be a venturi with its throat in said intermediate region. The radial and axial location of the venturi with respect to the friction surfaces, together with the inclination of the duct, can be varied to suit individual applications in order to optimise the local thermal capacity and cooling.

There now follows a detailed description, to be read with reference to the accompanying drawings, of three disc brake rotors which are illustrative of the invention.

Figure 1:
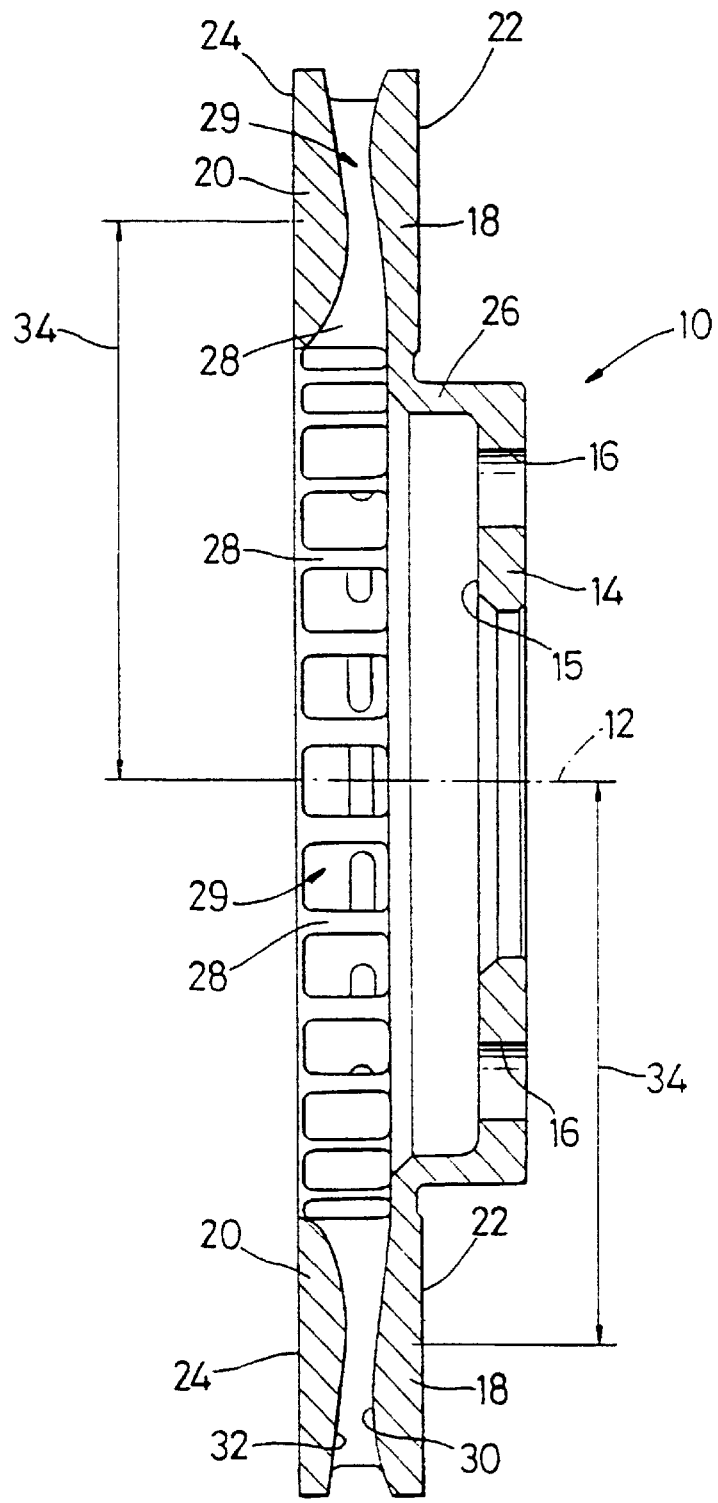
FIG. 1 is a cross-section taken through the first illustrative rotor, the top and bottom portions of FIG. 1 showing two different variations in the form of the friction portions of the rotor.

The first illustrative disc brake rotor 10 shown in FIG. 1 is arranged to rotate with a hub (not shown) about an axis 12. The rotor 10 comprises a mounting portion 14 which is annular about the axis 12 and has a flat radially extending side surface 15 which is arranged to engage said hub. The mounting portion 14 is arranged to be secured to said hub for rotation therewith by bolts passing through holes 16 in the mounting portion 14. These bolts also secure the wheel to the hub.

The rotor 10 also comprises a first friction portion 18 and a second friction portion 20. The portions 18 and 20 provide two oppositely-facing annular friction surfaces 22 and 24 of the rotor. The rotor 10 also comprises a connecting portion 26 which joins said mounting portion 14 to said first friction portion 18. The connecting portion 26 is cylindrical about the axis 12. The portions 14, 18, 20 and 26 are integral, being cast as one piece out of iron (other metals or composite materials are possible instead of iron).

The first friction portion 1, which provides the annular friction surface 22, and the second friction portion 20, which provides the annular friction surface 24, are displaced axially relative to said mounting portion 14 with the first friction portion 13 nearer to the mounting portion 14 than the second friction portion 20. The portions 18 and 20 are arranged in spaced parallel relationship with the surfaces 22 and 24 extending radially of the axis 12. The first friction portion 18 is supported by the connecting portion 26 which joins it to the mounting portion 14. The second friction portion 20 is supported by vanes 28 which extend between said friction portions 18 and 20. The vanes 28 are cast integrally with the portions 18 and 20 and define cooling ducts 29 extending radially outwardly of the rotor 10.

The vanes 28 join a surface 30 of the first friction portion 18, which is on the opposite side of the portion 18 to the surface 22, to a surface 32 of the second friction portion 20, which is on the opposite side of the portion 20 to the surface 24. The ducts 29 pass between the surfaces 30 and 32 and between the vanes 28 and are arranged so that, as the rotor 10 is rotated, air enters the ducts 29 through entrances at their radially inner ends, the entrances being adjacent to the radially inner edges of the friction portions 18 and 20. The air passes through the ducts 29, and leaves through exits which are adjacent to the outer edges of the portions 18 and 20. The air passing through the ducts 29 acts to cool the rotor 10.

As can be seen in FIG. 1, the first 18 and the second 20 friction portions vary in thickness in radial directions, ie their thicknesses vary at different radii, although, at a given radius, the thickness of each portion 18 and 20 is constant around the axis 12. In both the variation shown in the lower half of FIG. 1 and the variation shown in the upper half thereof, the first friction portion 18 has its greatest thickness at a radius which is greater than the radius at which the second friction portion 20 has its greatest thickness. Specifically, the first friction portion 18 has its greatest thickness at a radius which is greater than a medial radius 34 which is the radius of the mid-points of the ducts 29. The second friction portion 20 has its greatest thickness at a radius which is less than said medial radius 34.

In the rotor 10, the thickness of the first 18 and the second 20 friction portions varies so that the transverse cross-sectional area of each duct 29 decreases progressively between an inlet to the duct and an intermediate region thereof and increases between said intermediate region and an outlet of the duct. Thus, each duct is in the form of a venturi. In the variation illustrated in the lower half of FIG. 1, the throat of the venturi is positioned centrally between the friction surfaces 22 and 24. In the upper half of FIG. 1, however, the venturi has been off-set towards the friction surface 22 of the first friction portion 18. This provides an increase in the thickness of the second friction portion 20 to compensate for the higher temperatures likely on the second friction portion 20 due to this portion not enjoying the benefit of being connected to the connecting portion 26 (which acts as a heat sink for the first friction portion 18).

To achieve this thickness variation in the portions 18 and 20 of the rotor 10, the surfaces 30 and 32 are, in radial cross-section, defined sections which are arcuate about centres extending normally of the axis 12. In the variation shown in the lower half of FIG. 1, each of the surfaces 30 and 32 is defined by a single arc but, in the variation shown in the upper half of FIG. 1, each of the surfaces is defined by two arcs which merge together. These curves give the friction portions 18 and 20 the approximate shape of an aerofoil so that air flow through the ducts 29 is facilitated.

The rotor 10 is found, in service, to have reduced peak and mean temperatures compared to conventional rotors, reducing coning and the risk of cracking.

Figure 2:
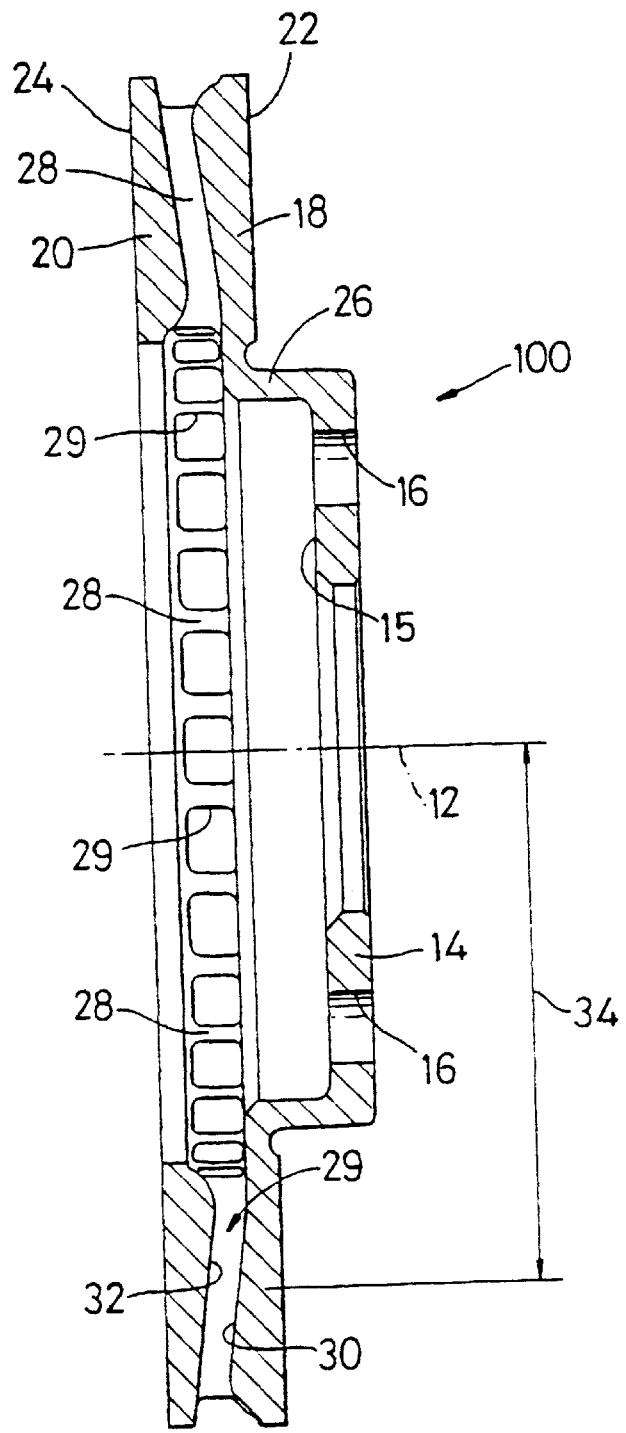
FIG. 2 is a cross-section taken through the second illustrative rotor.

The second illustrative disc brake rotor 100, shown in FIG. 2, is similar to the rotor 10 except as hereinafter described and like parts are given the same reference numerals. The rotor 100 comprises a mounting portion 14, first 18 and second 20 friction portions, a connecting portion 26, and vanes 28.

The first friction portion 18 of the rotor 100 is relatively thin at its junction with the connecting portion 26 and uniformly increases in thickness in the radially outward direction reaching its thickest in the vicinity of the exits of the ducts 29, ie adjacent to the radially outer edge of the portion 18. Beyond the exits of the ducts 29 in the radially outward direction, the thickness of the portion 18 reduces. In order to achieve this thickness variation, the surface 30 inclines away from the surface 22 in the radially outward direction, until the vicinity of the exits of the ducts 29 is reached, and then approaches it.

The second friction portion 20 of the rotor 100 is relatively thin adjacent to its outer radial edge and increases in thickness in the radially inwards direction to its thickest point which is in the vicinity of the entrances of the ducts 29, ie the portion 20 is at its thickest adjacent to its radially inner edge. Thereafter, the thickness of the portion 20 reduces. In order to achieve this thickness variation, the surface 32 inclines away from the surface 24 in the radially inwards direction to the thickest point, and then approaches it. Thus, in the rotor 100, the first friction portion 18 has its greatest thickness at a greater radius than the radius at which the second friction portion 20 has its greatest thickness.

The inclinations of the surfaces 30 and 32 of the rotor 100 are equal so that the combined thickness of the first 18 and the second 20 friction portions is substantially equal along the length of the cooling ducts 29. Furthermore, the cooling ducts are of substantially constant width along their length. As can be seen from FIG. 2, the cooling ducts 29 are slightly serpentine as their main portions are inclined to their entrances and exits.

In the rotor 100, the first friction portion 18 is at its thickest and, therefore has its greatest thermal capacity, adjacent to its outer radial edge which, in normal service conditions, is where it needs to absorb most heat. The second friction portion 20 is at its thickest and, therefore has its greatest thermal capacity, adjacent to its inner radial edge which, in normal service conditions is where it needs to absorb most heat.

The second illustrative rotor 100 is found, in service, to have reduced peak and mean temperatures than conventional rotors, reducing coning and the risk of cracking.

Figure 3:
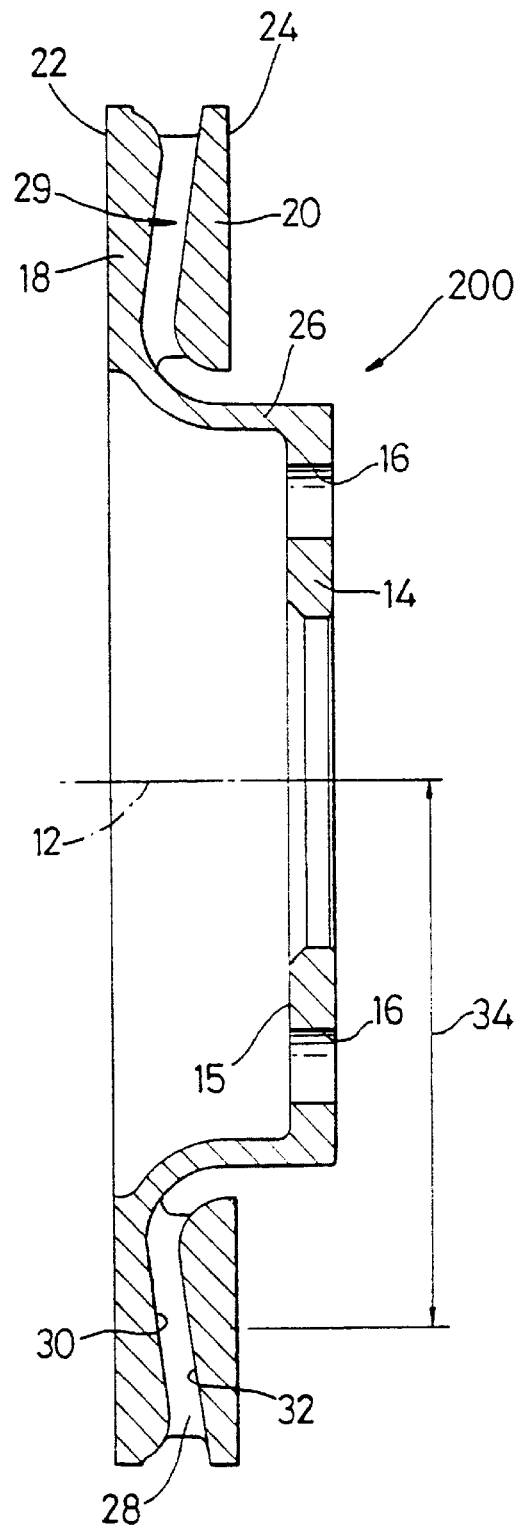
FIG. 3 is a cross-section taken through the third illustrative rotor.

The third illustrative disc brake rotor 200 shown in FIG. 3 is similar to the rotor 100 except as hereinafter described and like parts are given the same reference numerals. The rotor 200 comprises a mounting portion 14, first 18 and second 20 friction portions, a connecting portion 26, and vanes 28.

The rotor 200 differs from the rotor 100 in that the friction portions 18 and 20 are reversed relative to the mounting portion 14, ie the first friction portion 18 is further from the mounting portion 14 than the second friction portion 20 and has its surface 22 facing away from the mounting portion 14. The connecting portion 26 still joins said mounting portion 14 to said first friction portion 18 but is longer (for a given offset of the portion 14 from the surfaces 22 and 24) than the rotor 10. The second friction portion 20 extends around the connecting portion 26, from which it is spaced, and is supported by the vanes 28.

As the rotor 200 is rotated, air enters the ducts 29 through the gap between the second friction portion 20 and the connecting portion 26 into entrances of the ducts 29 which are adjacent to the radially inner edges of the portions 18 and 20. The air passes through the ducts 29, and leaves through exits which are adjacent to the outer edges of the surfaces 30 and 32.

As can be seen in FIG. 3, the first 18 and the second 20 friction portions of the rotor 200 vary in thickness in substantially the same manner as in the rotor 100. Specifically, the first friction portion 18 is relatively thin at its junction with the connecting portion 26 and increases in thickness uniformly reaching its thickest in the vicinity of the exits of the ducts 29, ie adjacent to the radially outer edge of the portion 18. Thereafter, the thickness reduces. In order to achieve this thickness variation, the surface 30, over most of its radial extent, inclines away from the surface 22 in the radially outward direction. The second friction portion 20 is relatively thin adjacent to its outer radial edge and increases in thickness to its thickest point which is in the vicinity of the entrances of the ducts 29, ie the portion 20 is at its thickest adjacent to its radially inner edge. Thereafter, the thickness reduces. In order to achieve this thickness variation, the surface 32, over most of its radial extent, inclines away from the surface 24 in the radially inward direction.

What is claimed is:

1. A disc brake rotor arranged to rotate with a member about an axis and providing two oppositely-facing annular friction surfaces, the rotor comprising a mounting portion arranged to engage said member and be secured thereto, a first friction portion which provides one of said annular surfaces, and a second friction portion which provides the other of said annular surfaces, said first and second friction portions being displaced axially relative to said mounting portion and being arranged in spaced parallel relationship, the first friction portion being supported by a connecting portion of the rotor which extends axially and joins said mounting portion to said first friction portion, the second friction portion being supported by vanes which extend between said friction portions and define cooling ducts extending radially outwardly of the rotor, the ducts being arranged so that, as the rotor is rotated, air passes through the ducts and acts to cool the rotor, wherein the first and the second friction portions vary in thickness in radial directions, the first friction portion (18) having its greatest thickness at a greater radius than the radius at which the second friction portion has its greatest thickness, wherein the thickness of the first and the second friction portions varies so that the transverse cross-sectional area of each duct decreases progressively between an inlet to the duct and an intermediate region thereof and increases between said intermediate region and an outlet of the duct.

2. A rotor according to claim 1, wherein the first friction portion has its greatest thickness at a radius which is greater than a medial radius which is the radius of the mid-points of the ducts, and the second friction portion has its greatest thickness at a radius which is less than said medial radius.

3. A rotor according to claim 1, wherein the first friction portion is thickest adjacent to its radially outer edge and the second friction portion is thickest adjacent to its radially inner edge.

4. A rotor according to claim 1, wherein said first friction portion is thinnest adjacent to its radially inner edge, and said second friction portion is thinnest adjacent to its radially outer edge.

5. A rotor according to claim 1, wherein the thickness of said first and second friction portions vary uniformly between their thickest and thinnest parts.

6. A rotor according to claim 1, wherein the combined thickness of the first and second friction portions is substantially equal along the length of the cooling ducts (29).

7. A rotor according to claim 3, wherein the first friction portion is thinnest adjacent to its radially inner edge, and said second friction portion is thinnest adjacent to its radially outer edge.

8. A rotor according to claim 7, wherein the thicknesses of said first and second friction portions vary uniformly between their thickest and thinnest parts.

9. A rotor according to claim 8, wherein the combined thickness of the first and the second friction portions is substantially equal along the length of the cooling ducts.

* * * * *